United States Patent
Kim et al.

(10) Patent No.: US 8,982,295 B2
(45) Date of Patent: Mar. 17, 2015

(54) DISPLAY DEVICE COMPRISING A FRAME HAVING A TOP SEGMENT THAT INCLUDES A FIRST TOP FLAT PART, A SECOND TOP FLAT PART, AND A TOP UPLIFTED PART INTERPOSED BETWEEN THE FIRST AND SECOND TOP FLAT PARTS

(75) Inventors: Yun Ho Kim, Cheonan-si (KR); Jeong Seok Oh, Seoul (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 787 days.

(21) Appl. No.: 13/178,424

(22) Filed: Jul. 7, 2011

(65) Prior Publication Data
US 2012/0162564 A1    Jun. 28, 2012

(30) Foreign Application Priority Data
Dec. 23, 2010    (KR) .................. 10-2010-0133785

(51) Int. Cl.
G02F 1/1333    (2006.01)
G02F 1/1335    (2006.01)
G06F 1/16    (2006.01)
G09G 3/34    (2006.01)

(52) U.S. Cl.
CPC ........ G02F 1/133308 (2013.01); G06F 1/1601 (2013.01); G02F 2001/133314 (2013.01); G02F 2001/133317 (2013.01); G02F 2001/13332 (2013.01); G09G 3/3406 (2013.01)
USPC .............................................. 349/58; 349/61

(58) Field of Classification Search
USPC .................................................. 349/58, 61–65
See application file for complete search history.

(56) References Cited

U.S. PATENT DOCUMENTS

2006/0290836 A1* 12/2006 Chang ............................ 349/58

FOREIGN PATENT DOCUMENTS

| JP | 2001-343665 A | 12/2001 |
| KR | 10-2007-0077267 A | 7/2007 |
| KR | 10-2008-0084350 A | 9/2008 |

* cited by examiner

*Primary Examiner* — Paul Lee
(74) *Attorney, Agent, or Firm* — Knobbe, Martens, Olson & Bear, LLP (57) ABSTRACT

A display device includes a frame for receiving a display panel. The frame includes a bottom segment extending in a first direction, a top segment spaced from the bottom segment in a direction perpendicular to the first direction, the top segment extending in the first direction, and a side segment connecting a side of the bottom segment and a side of the top segment, the side segment extending in the first direction. The top segment includes a top uplifted part protruding in the direction perpendicular to the first direction.

18 Claims, 7 Drawing Sheets

DISPLAY DEVICE COMPRISING A FRAME HAVING A TOP SEGMENT THAT INCLUDES A FIRST TOP FLAT PART, A SECOND TOP FLAT PART, AND A TOP UPLIFTED PART INTERPOSED BETWEEN THE FIRST AND SECOND TOP FLAT PARTS

CROSS-REFERENCE TO RELATED APPLICATIONS

This U.S. non-provisional patent application claims priority under 35 U.S.C. §119 of Korean Patent Application No. 10-2010-0133785, filed on Dec. 23, 2010, the entire contents of which are hereby incorporated by reference.

BACKGROUND

The present disclosure herein relates to a display device.

Display devices are widely used in a variety of electronic products such as televisions, computers, and small-sized electronic devices such as portable terminals and personal digital assistants (PDAs) because of their features such as lightweight, slimness, and low power consumption. Since the display devices are used in a variety of electronic devices and industrial fields, an increasing need exists for display devices having high reliability.

Such a display device may include a display panel and a driving circuit for driving pixel cells included in a display panel. When the driving circuit for driving the display panel is damaged, reliability of the display panel may be deteriorated. Thus, studies with respect to protection of a driving circuit for high reliability are being conducted.

SUMMARY

The present disclosure provides a display device having high reliability.

The present disclosure also provides a display device including a frame, which can protect a driving circuit.

Embodiments of the inventive concept provide display devices including: a frame for receiving a display panel, wherein the frame includes: a bottom segment extending in a first direction; a top segment spaced from the bottom segment in a direction perpendicular to the first direction, the top segment extending in the first direction; and a side segment connecting a side of the bottom segment and a side of the top segment, the side segment extending in the first direction, wherein the top segment may include a top uplifted part protruding in the direction perpendicular to the first direction.

In some embodiments, the side segment may include a side uplifted part protruding in a second direction perpendicular to the first direction.

In other embodiments, the frame may define an inner space formed by the segments, and the top and side uplifted parts may protrude to the outside of the frame.

In still other embodiments, display devices may further include a panel driver including a driving line, wherein the frame may include a line region covered by the driving line and a non-line region, which is not covered by the driving line, and the top and side uplifted parts may be disposed on the non-line region.

In even other embodiments, the top segment may include a top flat part within the line region, and the top uplifted part may include a top protrusion part protruding from the top flat part and first and second top inclined parts disposed at sides of the top protrusion part, wherein the top inclined parts may connect the top protrusion part to the top flat part.

In yet other embodiments, the top protrusion part may be disposed at a center of the non-line region.

In further embodiments, the display panel may include a lower substrate and an upper substrate on the lower substrate, wherein a top surface of the top protrusion part may be disposed at the same level as a top surface of the upper substrate.

In still further embodiments, the top flat part and the top uplifted part may be formed in a single piece.

In even further embodiments, the top protrusion part may be disposed adjacent to the line region adjacent to the first top inclined part, and the first top inclined part may have a length less than that of the second top inclined part in the first direction.

In yet further embodiments, the first top inclined part may have an inclination greater than that of the second top inclined part.

In much further, the top uplifted part may include a plurality of top protrusion parts protruding from the top flat part and top inclined parts disposed at sides of each of the top protrusion parts, wherein the top inclined part adjacent to the top flat part may connect the top flat part to the top protrusion part.

In still much further, the top uplifted part may include an intermediate flat part having the same level at the top flat part, the intermediate flat part being between the top protrusion parts adjacent to each other, and the top inclined parts between the intermediate flat part and the top protrusion parts may connect the intermediate flat part to the top protrusion parts.

In even much further, the side segment may include a side flat part within the line region, and the side uplifted part may include a side protrusion part protruding from the side flat part and first and second side inclined parts disposed at sides of the side protrusion part, wherein the side inclined parts may connect the side protrusion part to the side flat part.

In yet much further, the side protrusion part may be disposed at a center of the non-line region.

In still yet much further, the side flat part and the side uplifted part may be formed in a single piece.

In even yet much further, the bottom segment may have a length greater than that of the top segment in the second direction.

In further yet much further, the display panel may include a liquid crystal display panel, and the display devices may further include: a backlight unit supplying light to the liquid crystal display panel; and a mold frame surrounding the backlight unit and supporting the liquid crystal display panel, the mold frame being received into the frame.

In further yet much further, the bottom, top, and side segments may constitute the integral frame.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain principles of the inventive concept. In the drawings.

DETAILED DESCRIPTION OF EMBODIMENTS

Aspects, characteristics and advantages of the inventive concept will be easily understood from an explanation of embodiments that are described in detail below by reference to the attached drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art.

An embodiment described and exemplified herein includes a complementary embodiment thereof. The word 'and/or' means that one or more or a combination of relevant constituent elements is possible. In the drawings, like reference numerals refer to like elements throughout.

Figure 1:
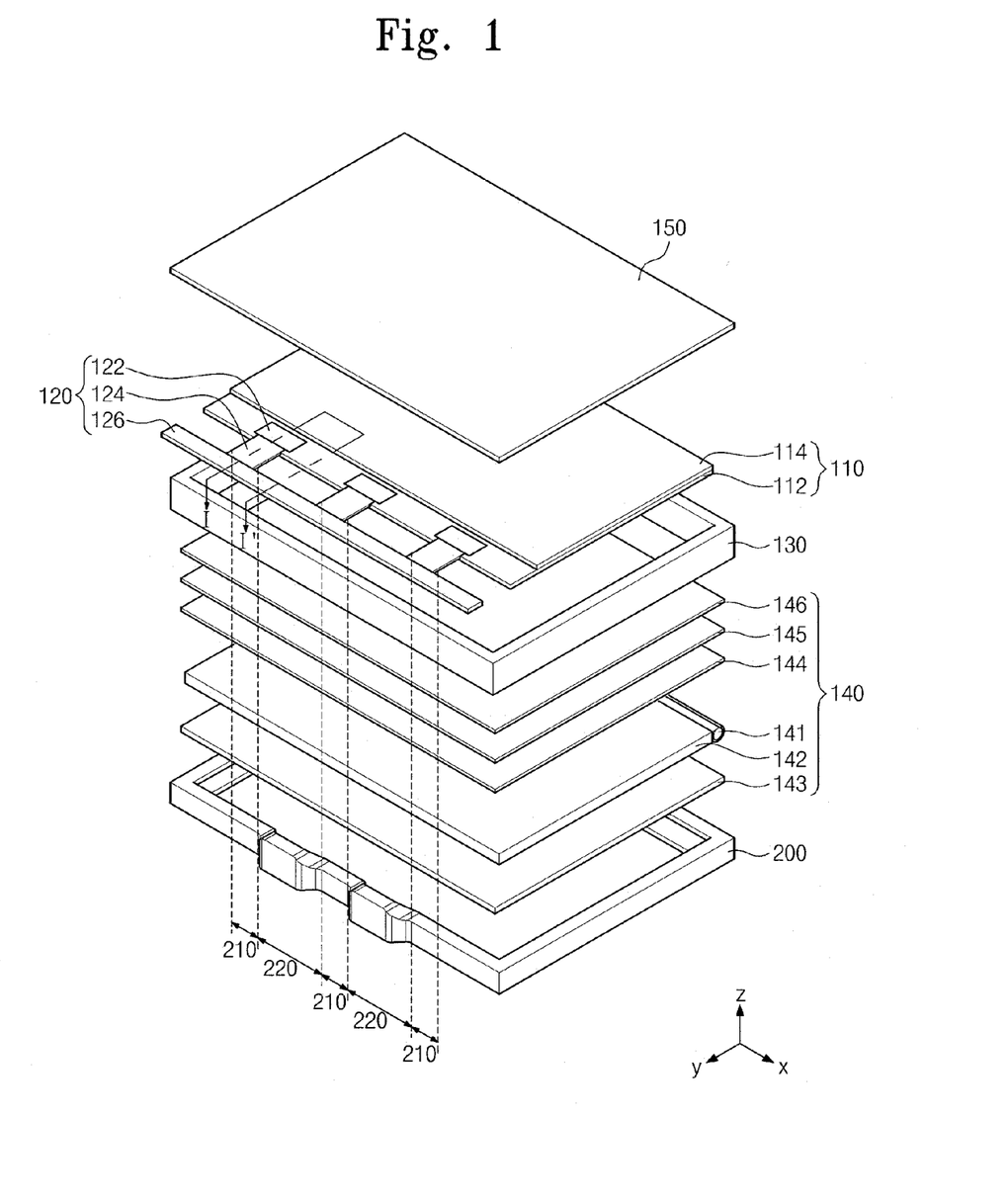
FIG. 1 is a perspective view of a display device according to an embodiment of the inventive concept.

A display device according to an embodiment of the inventive concept is described below. FIG. 1 is a perspective view of a display device according to an embodiment of the inventive concept, and FIG. 2 is a sectional view of the display device of FIG. 1, taken along line A-A' of FIG. 1.

Figure 2:
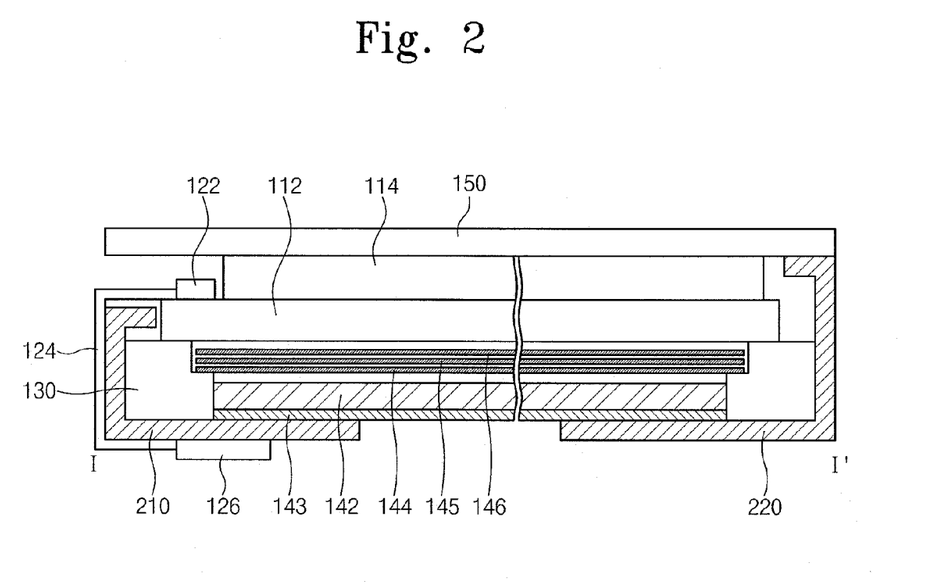
FIG. 2 is a sectional view of the display device of FIG. 1, taken along line A-A' of FIG. 1.

Referring to FIGS. 1 and 2, a display device according to an embodiment of the inventive concept may include a display panel 110, a panel driver 120, a mold frame 130, a backlight unit 140, a frame 200, and a glass substrate 150 covering the display panel 110.

The display panel 110 may be a liquid crystal panel. The display panel 110 may include a lower substrate 112, an upper substrate on the lower substrate 112, and a liquid crystal layer between the lower substrate 112 and the upper substrate 114. The lower substrate 112 may include a plurality of gate lines extending in one direction, a plurality of data lines crossing the gate lines, and a thin film transistor disposed on a portion at which the gate lines cross the data lines. The upper substrate 114 may be a color filter substrate on which a color filter array is disposed. The display panel 110 may include a plurality of pixel cells including the thin film transistor.

The panel driver 120 may include the driving circuit 122 disposed on the lower substrate 112, a control board 126 for transmitting a signal to the driving circuit 122, and a driving line 124 connecting the driving circuit 122 to the control board 126. The driving circuit 122 may include a gate driving unit for successively supplying a gate-on voltage the gate lines of the lower substrate 112 and a data driving unit for supplying a data voltage to the data lines of the lower substrate 112. The driving circuit 122 may be mounted on the lower substrate 112 in a chip on glass (COG) manner. On the other hand, the driving circuit 112 may be mounted on a tape carrier package (TCP) and connected to the lower substrate 112.

The control board 126 may include a timing control unit for transmitting a timing signal to the gate driving unit and the data driving unit and a power supply unit. The power supply unit may supply an on/off voltage to the gate driving unit and the data voltage to the data driving unit. The control board 126 may be disposed under the frame 200. The driving line 124 may cover a portion of an outer surface of the frame 200 and connect the control board 126 disposed under the frame to the driving circuit 122 disposed on the lower substrate 112.

The backlight unit 140 may include at least one light source 141, a light guide plate 142, a reflection sheet 143, a diffusion sheet 144, a prism sheet 145, and a protection sheet 146. The light source 141 can generate light which may be supplied to an incident part of a side surface of the light guide plate 142. The light source 141 may be a lamp or a light emitting diode (LED). The light guide plate 142 may guide the light generated from the light source 141 to the display panel 110. The reflection sheet 143 may reflect the light supplied into a lower portion of the light guide plate 142 toward the display panel 110 to improve light use efficiency.

The diffusion sheet 144 may widely diffuse the light supplied from the light guide plate 142. Thus, occurrence of dark lines and bright lines of the light supplied into the light guide plate 142 may be minimized. The prism sheet 145 may increase collimation of the light diffused by the diffusion sheet 144. Thus, light having high luminance may be supplied into the display panel 110. The protection sheet 146 may minimize defectiveness such as scratch occurring when the backlight unit 140 is transferred.

The mold frame 130 may support the display panel 110 and surround the backlight unit 140. The mold frame 130 may be received in the frame 200. The frame 200 is described with reference to FIG. 3 below.

Figure 3:
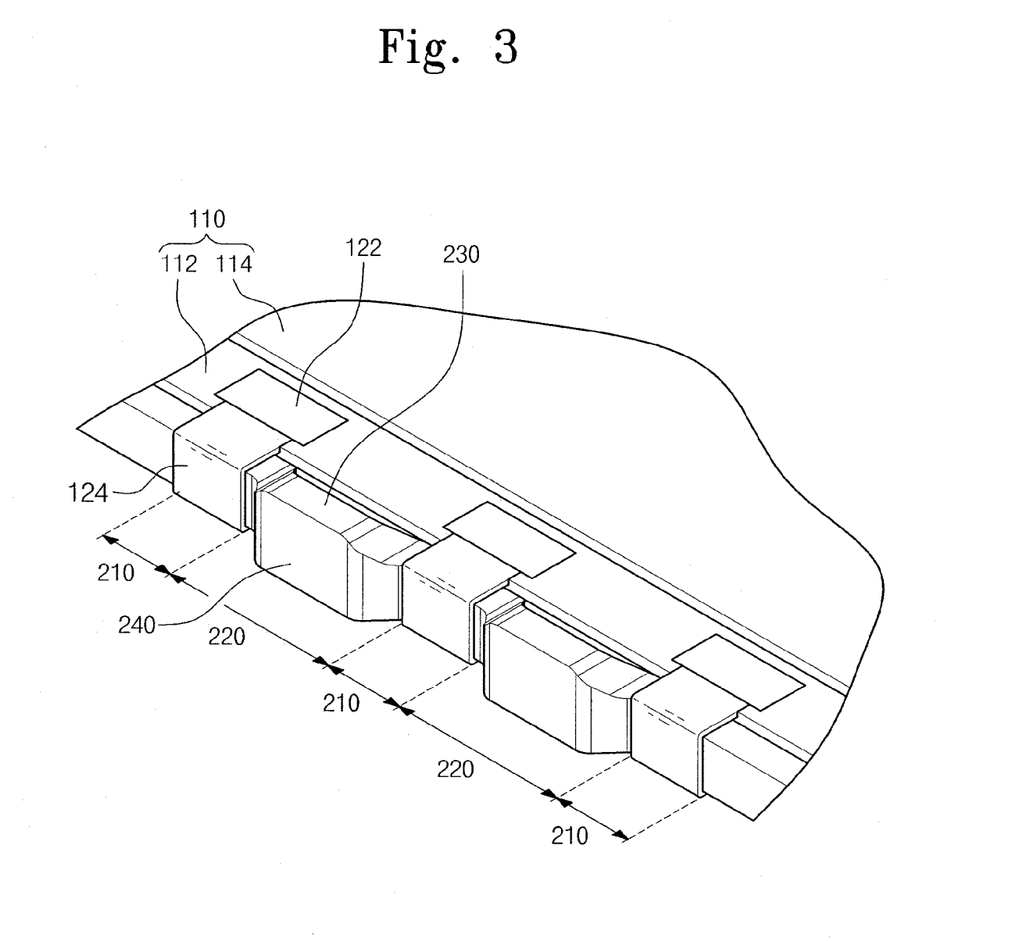
FIG. 3 is a perspective view illustrating a portion of the display device according to an embodiment of the inventive concept.

FIG. 3 is a perspective view illustrating a portion of the display device according to an embodiment of the inventive concept. FIG. 1 illustrates a portion of the display device described with reference to FIG. 1.

Referring to FIGS. 1 and 3, the frame 200 may include a line region 210 covered by the driving line 124 and a non-line region 220, which is not covered by the driving line 124. The line region 210 of the frame 200 may be a region which is covered by the driving line 124 connecting the control board 126 disposed on the lower surface of the frame 200 to the driving circuit 122 disposed on the lower substrate 112.

The non-line region 220 of the frame 200 may include a top uplifted 230 and a side uplifted 240. The top uplifted 230 may be a portion which protrudes upward than the frame 200 of the line region 220. The side uplifted 240 may be a portion which protrudes laterally toward the outside of the frame 200 than that of the frame 200 of the line region 220. The top uplifted 230 and the side uplifted 240 of the frame 200 is described with reference to FIGS. 4A to 4C below.

Figure 4A:
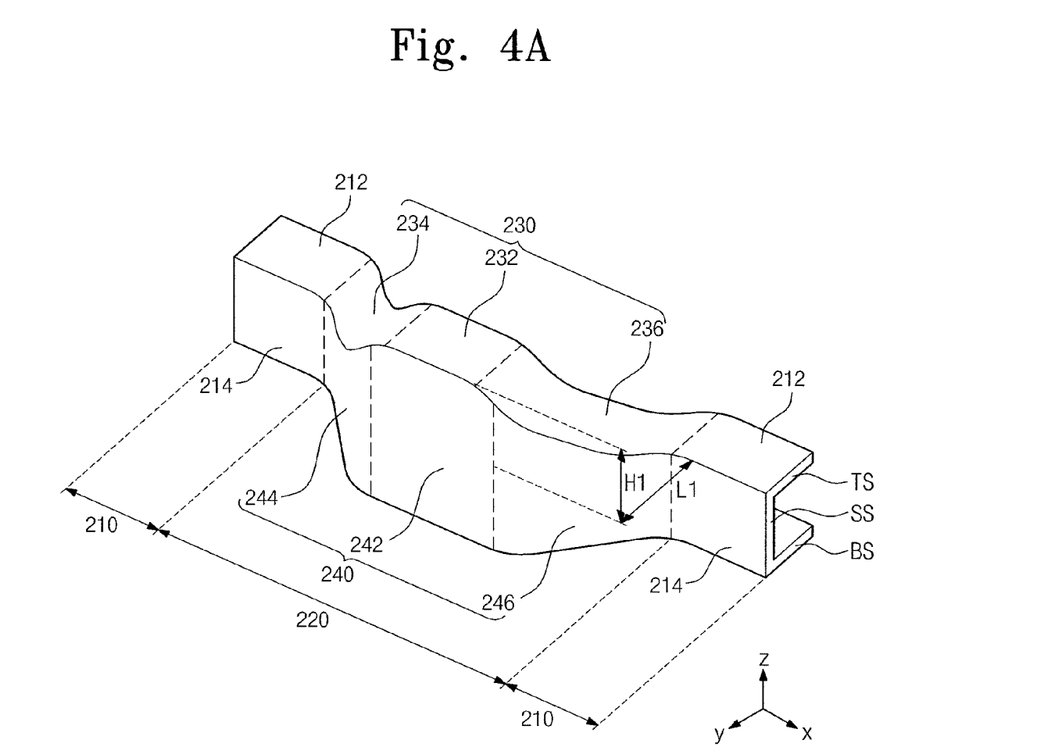
FIG. 4A is a perspective view illustrating a portion of a frame included in the display device according to an embodiment of the inventive concept.
Figure 4B:
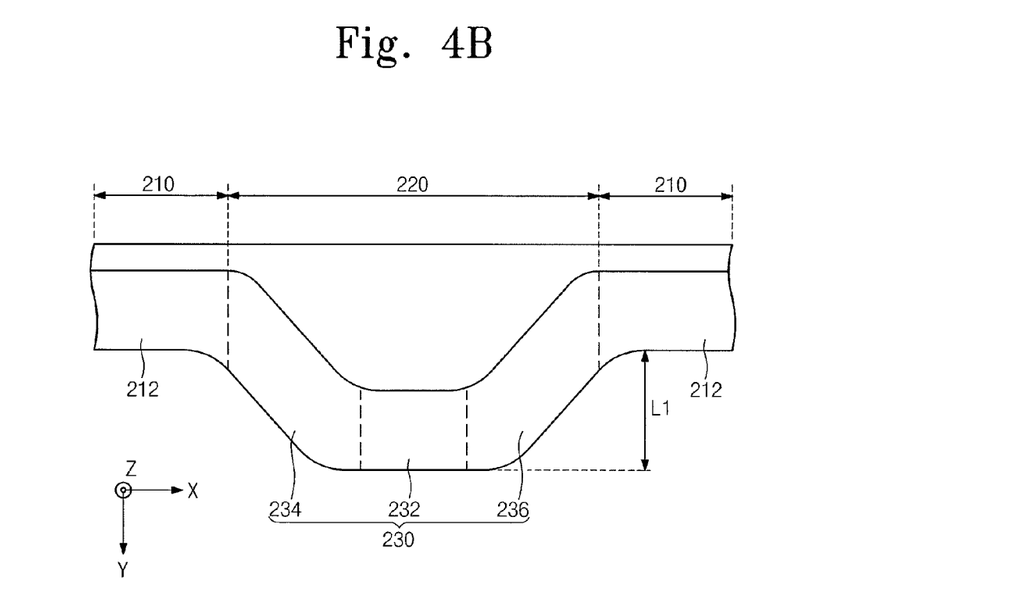
FIGS. 4B and 4C are plan views illustrating a portion of the frame included in the display device according to an embodiment of the inventive concept.
Figure 4C:
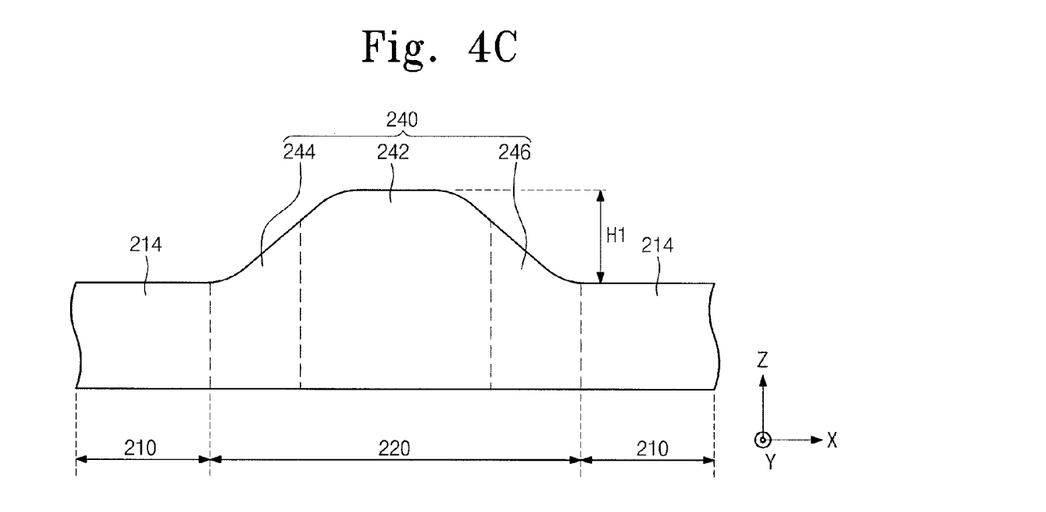

FIGS. 4A to 4C are views of the frame included in the display device according to an embodiment of the inventive concept. FIG. 4A is an enlarged perspective view illustrating the non-line region of the frame illustrated in FIGS. 1 and 3. FIGS. 4B and 4C are plan views when viewed from a z-axis direction and a y-axis direction of FIG. 4A.

Referring to FIGS. 4A to 4C, the frame may include a bottom segment BS extending in a first direction, a top segment TS spaced from the bottom segment BS, a side segment SS. The top segment TS may be spaced from the bottom segment BS in a direction perpendicular to the first direction and extend in the first direction. The side segment SS may connect a side surface of the bottom segment BS and a side surface of the top segment TS, which are adjacent to each other, and extend in the first direction. The bottom segment BS may have a length greater than that of the top segment TS in a second direction perpendicular to the first direction. In drawings, the first direction may be an x-axis direction, the second direction may be a y-axis direction, and the direction perpendicular to the first direction may be a z-axis direction.

The frame 200 may define an inner space formed by the bottom, side, and top segments BS, SS, and TS. The bottom, side, and top segments BS, SS, and TS may be connected to each other without forming interfaces therebetween. Thus, the frame 200 may be formed in a single piece.

The top segment 15 may include a top flat part 212 within the line region 210 and a top uplifted part 230 within the non-line region 220. The top flat part 212 may have a flat top surface. The top uplifted part 230 may protrude or be elevated from the top flat part 212 toward the outside of the frame. The top uplifted part 230 may be connected to the top flat part 212 without forming an interface therebetween. Thus, the top segment TS may be formed in a single piece.

The top uplifted part 230 may include a top protrusion part 232 and first and second top inclined parts 234 and 236 disposed at left and right sides of the top protrusion part 232, respectively. The top protrusion part 232 may have a substantially flat top surface. On the other hand, the top protrusion part 232 may have a curved top surface. The top protrusion part 232 may be disposed at a level higher by a first height H1 than that of the top flat part 212 in a third direction with respect to the bottom segment BS. In drawings, the third direction may be the z-axis direction. Referring again to FIG. 2, a top surface of the top protrusion part 232 may be disposed at a level substantially equal to that of the top surface of the upper substrate 114 of the display panel 110. Thus, when an additional substrate 150 is further disposed on the upper substrate 114, the top protrusion part 232 may support the additional substrate 150 and prevent the driving circuit 220 from being damaged. Thus, the display having high reliability may be provided. The additional substrate 150 may be a glass substrate.

If the frame does not include the top protrusion part 232 and the glass substrate is disposed on the upper substrate 114, the glass substrate may contact the driving circuit 122 disposed on an edge of the display device due to bending of the display device and the driving circuit 122 may be damaged. When the driving circuit 122 is damaged, the defects of the display device may occur and reliability of the display device may be deteriorated.

However, as described above, according to an embodiment of the inventive concept, since the top protrusion part 232 is disposed at the same level as the top surface of the upper substrate 114, the top protrusion part 232 may support the additional substrate disposed on the upper substrate 114 to protect the driving circuit 122.

Referring again to FIG. 3, the first and second top inclined parts 234 and 236 may connect the top protrusion part 232 and the top flat parts 212 which are adjacent to the first and second top inclined parts 234 and 234, respectively. Thus, the top surfaces of the first and second top inclined parts 234 and 235 closer to the top protrusion part 232 may have higher levels in the third direction with respect to the top flat part 212.

The top protrusion part 232 may be disposed at a central portion of the non-line region 220. In this case, the first and second top inclined parts 234 and 236 may have the substantially same length in the first direction. In addition, the first and second top inclined parts 234 and 236 may have the substantially same inclination with respect to the top flat part 212.

On the other hand, the top protrusion part 232 may be disposed closer to a line region 210 adjacent to one of the first and second top inclined parts 234 and 236 to a line region adjacent to the other. When the top protrusion part 232 is disposed closer to the line region 210 adjacent to the first top inclined part 234, the first top inclined part 234 may have a length less than that of the second top inclined part 236 in the first direction. The first top inclined part 234 may have an inclination greater than that of the second top inclined part 236.

The side segment SS may include a side flat part 214 within the line region 210 and a side uplifted part 240 within the non-line region 220. The side flat part 214 may have a flat side surface. The side uplifted part 240 may protrude to the outside of the frame 200. The side uplifted part 240 may protrude from the side flat part 214 in the second direction. The side uplifted part 240 may be connected to the side flat part 214 without forming an interface therebetween. Thus, the side segment SS may be formed in a single piece.

The side uplifted part 240 may include a side protrusion part 242 and first ands second side inclined parts 244 and 246 disposed at left and right sides of the side protrusion part 242, respectively. The side protrusion part 242 may have a substantially flat side surface. On the other hand, the side protrusion part 242 may have a curved side surface. The side protrusion part 242 may be protruded from the side flat part 214 by a first length L1 in the second direction. The first and second side inclined parts 244 and 246 may connect the side protrusion part 242 and the side flat parts 214 which are adjacent to the first and second side inclined parts 244 and 246, respectively. Thus, side surfaces of the first and second side inclined parts 244 and 246 closer to the side protrusion part 242 may protrude farther in the second direction with respect to the side flat part 214.

As described above, according to an embodiment of the inventive concept, the side uplifted part 240 including the side protrusion part 242 may protrude from the side flat part 214 of the line region 210 in the second direction. Thus, the side protrusion part 242 may protect the driving line 124 (see FIG. 2) covering an outer surface of the frame 200 of the line region 210 from contact and impact of an external object. Thus, it may prevent the driving line 124 (see FIG. 2) from being damaged and provide the display device having high reliability.

The side protrusion part 242 may be disposed at a central portion of the non-line region 220. In this case, the first and second side inclined parts 244 and 246 may have the substantially same length as each other in the first direction. Also, in this case, the first and second side inclined parts 244 and 246 may have the substantially same inclination with respect to the side flat part 214.

On the other hand, the side protrusion part 242 may be disposed closer to the line region 210 adjacent to the first side inclined part 244. In this case, the first side inclined part 244 may have a length less than that of the second side inclined part 246 in the first direction. Also, the first side inclined part 244 may have an inclination greater than that of the second side inclined part 246 with respect to the side flat part 214.

The side protrusion part 242 may have a width in the first direction greater than that of the top protrusion part 232. In this case, a central portion of the side protrusion part 242 may contact the top protrusion part 232, and both end portions of the side protrusion part 242 may contact the first and second top inclined parts 234 and 236.

Unlike the embodiment illustrated in the drawings, the side protrusion part 242 may have a width in the first direction substantially equal to or less than that of the top protrusion part 232.

In alternative embodiments, the top segment of the frame may include a plurality of top protrusion parts. This is described with reference to FIGS. 5A to 5C below.

Figure 5A:
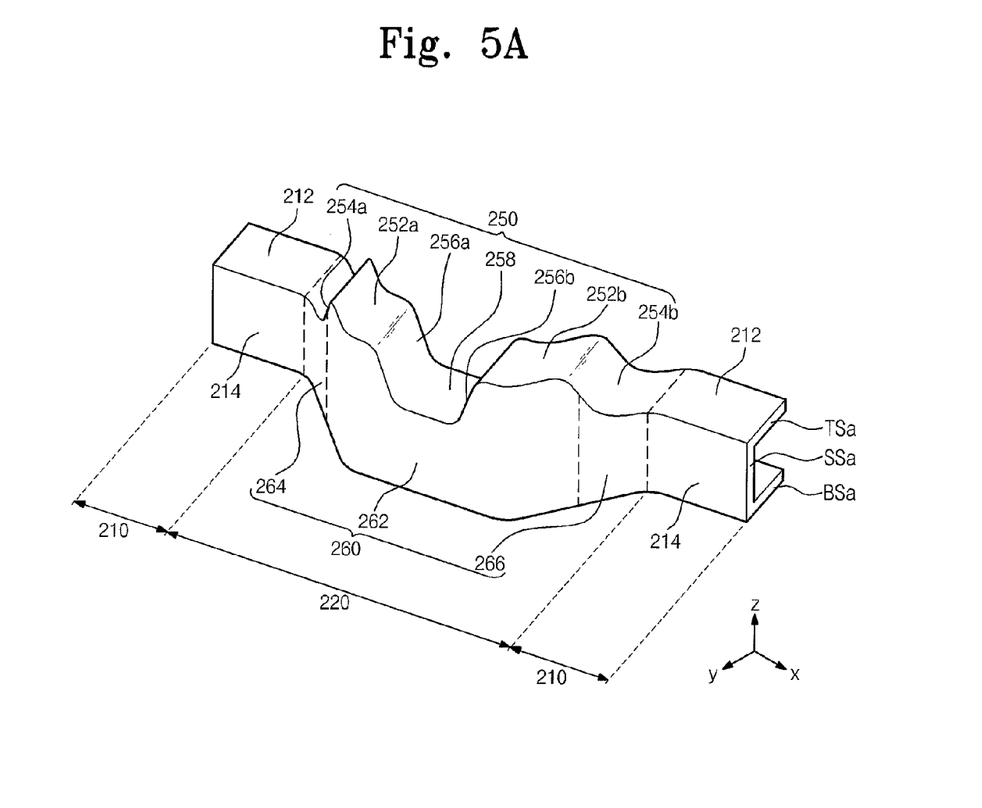
FIG. 5A is a perspective view illustrating a portion of a frame included in a display device according to a modified embodiment of the inventive concept.
Figure 5B:
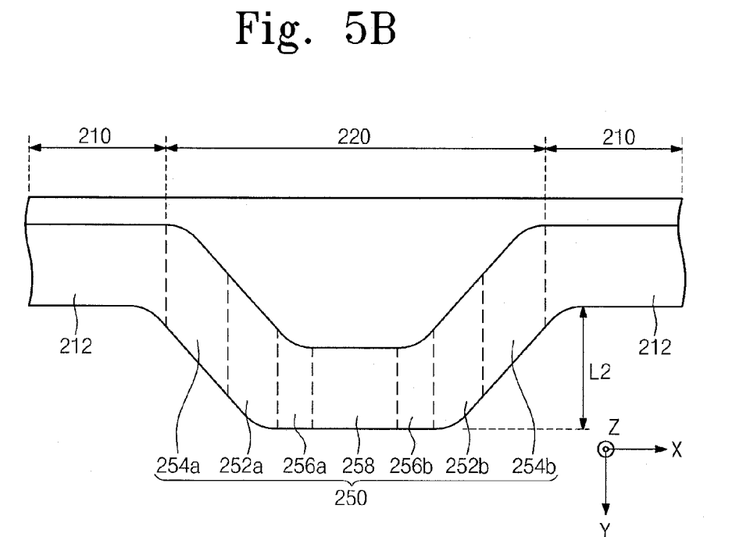
FIGS. 5B and 5C are plan views illustrating a portion of a frame included in a display device according to a modified embodiment of the inventive concept.
Figure 5C:
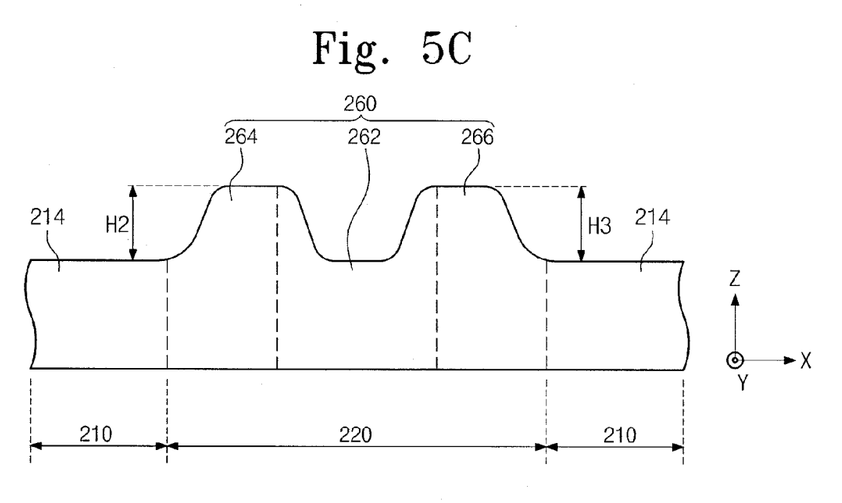

A frame included in a display device according to a modified embodiment of the inventive concept is described below. FIGS. 5A to 5C are views of a frame included in a liquid crystal display device according to a modified embodiment of the inventive concept. FIG. 5A is a perspective view illustrating a portion of a frame included in a display device according to a modified embodiment of the inventive concept. FIGS. 5B and 5C are plan views when viewed from a z-axis direction and a y-axis direction of FIG. 5A.

Referring to FIGS. 5A to 5C, a frame included in a display device according to a modified embodiment of the inventive concept may include a bottom segment BSa extending in a first direction, a top segment TSa spaced from the bottom segment BSa in a third direction and extending in the first direction, and a side segment SSa connecting a side surface of the bottom segment BSa to a side surface of the top segment TSa and extending in the first direction. The bottom, top, and side segments BSa, TSa, and SSa may be formed in a single piece without forming interfaces therebetween.

The top segment TSa may include a top flat part 212 within a line region 210 and a top uplifted part 250 within a non-line region 220. The top uplifted part 250 may include a portion protruding from the top flat part 212 to the outside of the frame. The top uplifted part 250 may be connected to the top flat part 212 without forming an interface therebetween, and thus, the top segment TSa may be formed in a single piece.

The top uplifted part 250 may include a plurality of top protrusion parts 252a and 252b, top inclined parts 254a, 254b, 256a, and 256b disposed at sides of the top protrusion parts 252a and 252b, and an intermediate flat part 258 disposed between the top protrusion parts 252a and 252b. The intermediate flat part 258 may be disposed at the substantially same level as the top flat part 212 in the third direction with respect to the bottom segment BSa. The first top protrusion part 252a may protrude by a second height H2 in the third direction with respect to the bottom segment BSa. The second top protrusion part 252b may protrude by a third height H3. The second and third heights H2 and H3 may be equal to each other.

The first top inclined part 254a disposed at one side of the first top protrusion part 252a and adjacent to the line region 210 may connect the first top protrusion part 252a to the top flat part 212. The second top inclined part 256a disposed at the other side of the first top protrusion part 252a and adjacent to the intermediate flat part 258 may connect the first top protrusion part 252a to the intermediate flat part 258. Thus, top surfaces of the first and second top inclined parts 254a and 256a disposed closer to the first top protrusion part 252a protrude farther in the third direction with respect to the top flat part 212.

The third top inclined part 254b disposed at one side of the second top protrusion part 252b and adjacent to the line region 210 may connect the second top protrusion part 252b to the top flat part 212. The fourth top inclined part 256b disposed at the other side of the second top protrusion part 252b and adjacent to the intermediate flat part 258 may connect the second top protrusion part 252b to the intermediate flat part 258. Thus, top surfaces of the third and fourth top inclined parts 254b and 256b closer to the second top protrusion part 252b protrude farther in the third direction with respect to the top flat part 212.

The intermediate flat part 258 may be disposed at a central portion of the non-line region 220. Alternatively, the intermediate flat part 258 may be disposed closer to the line region 210 adjacent to the first top protrusion part 252a than the second top protrusion part or disposed closer to the line region 210 adjacent to the second top protrusion part 252b than the first top protrusion part.

The side segment SSa may include a side flat part 214 within the line region 210 and a side uplifted part 260 within the non-line region 220. The side uplifted part 260 may protrude to the outside of the frame 200. The side uplifted part 260 may be connected to the side flat part 214 without forming an interface therebetween. Thus, the side segment SSa may be formed in a single piece.

The side uplifted part 260 may include a side protrusion part 262 and first ands second side inclined parts 264 and 266 disposed at sides of the side protrusion part 262. The side protrusion part 262 may protrude by a second length L2 from the side flat part 214 in the second direction. The first and second side inclined parts 264 and 266 may connect the side protrusion part 262 and the side flat parts 214 which are adjacent to the first and second side inclined parts 264 and 266, respectively. Thus, side surfaces of the first and second side inclined parts 264 and 266 closer to the side protrusion part 262 may protrude farther in the second direction with respect to the side flat part 214.

A side portion of the side protrusion part 262 contacting the top uplifted part 250 may contact the intermediate flat part 258, the second top inclined part 256a, the fourth top inclined part 256b, the first top protrusion part 252a, and the second top protrusion part 252b. Unlike the embodiment illustrated in the drawings, the side portion of the side protrusion part 262 contacting the top uplifted part 250 may contact the intermediate flat part 258 and may not contact the first and second top protrusion parts 252a and 252b.

Although the frame included in the display device according to an embodiment of the inventive concept with reference to FIGS. 1 and 2 is used for receiving the liquid crystal panel, the present disclosure is not limited thereto. The frame included in the display device according to an embodiment of the inventive concept may be used for receiving various panels such as an organic light emitting display panel, a plasma display panel, etc., in addition to the liquid crystal display panel.

According to the inventive concept, the frame included in the display device includes the bottom and top segments parallelly extending in the first direction and the side segment connecting the side surface of the bottom segment to the side surface of the top segment and extending in the first direction. The top segment may include the top uplifted part protruding in a direction perpendicular to the first direction to prevent the driving circuit included in the display device from being damaged. Therefore, the display panel having high reliability can be realized.

The above-disclosed subject matter is to be considered illustrative, and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A display device comprising a frame configured to receive a display panel,
   wherein the frame comprises:
   a bottom segment extending in a first direction;
   a top segment spaced from the bottom segment in a second direction perpendicular to the first direction, the top segment having a length in the first direction and a width in a third direction at a point along the length thereof, the third direction being perpendicular to the first and second directions; and a side segment connecting a side of the bottom segment and a side of the top segment, the side segment extending in the first direction, wherein the top segment comprises a first top flat part, a second top flat part and a top uplifted part interposed between the first and second top flat parts, the first top flat part comprising a first top flat surface, the second top flat part comprising a second top flat surface, the top uplifted part comprising a top uplifted surface that is lifted up from the first and second top flat surfaces away from the bottom segment, wherein the top uplifted surface extends in the third direction in the entire width of the top segment at a point of the top uplifted surface.

2. The display device of claim 1, wherein the side segment comprises a first side flat part, a second side flat part and a side uplifted part interposed between the first and second side flat parts, the first side flat part comprising a first side flat surface, the second side flat part comprising a second side flat surface, the side uplifted part comprising a side uplifted surface that is lifted up from the first and second side flat surfaces away from the bottom segment.

3. The display device of claim 2, wherein the frame defines an inner space formed by the segments, and wherein the top and side uplifted parts protrude toward the outside of the frame.

4. The display device of claim 2, further comprising:
a driving circuit disposed on the display panel;
a control board configured to transmit a signal to the driving circuit;
a driving line interconnecting between the control board and the driving circuit,
wherein at least part of the driving line extends over the first top flat surface and the first side flat surface and does not extend over the top uplifted surface or the side uplifted surface.

5. The display device of claim 1, wherein the top uplifted part further comprises a first inclined part linking between the top uplifted part and the first top flat part, and a second inclined part linking between the top uplifted part and the second top flat part.

6. The display device of claim 5, wherein the top uplifted part is interposed between the first and second inclined parts.

7. The display device of claim 5, wherein the display panel comprises a lower substrate and an upper substrate disposed over the lower substrate, wherein a top surface of the top uplifted part is disposed at a level substantially same as that of a top surface of the upper substrate.

8. The display device of claim 5, wherein the first and second top flat parts and the top uplifted part are formed in a single piece.

9. The display device of claim 5,
wherein the first inclined part is shorter than second inclined part in the first direction.

10. The display device of claim 9, wherein the first inclined part has an inclination greater than that of the second inclined part.

11. The display device of claim 1, wherein the top uplifted part comprises a plurality of top uplifted surfaces that are lifted up from the first and second top flat surfaces away from the bottom segment.

12. The display device of claim 11, wherein the top uplifted part comprises an intermediate flat surface at a level substantially same with that of the top flat surface, the intermediate flat part being disposed between two of the plurality of top uplifted surfaces.

13. The display device of claim 4, wherein the side uplifted part further comprises a first side inclined part linking between the side uplifted part and the first side flat art and a second side inclined part linking between the side uplifted part and the second side flat part.

14. The display device of claim 13, wherein the side uplifted part is interposed between the first and second side inclined parts.

15. The display device of claim 13, wherein the side flat parts and the side uplifted part are formed in a single piece.

16. The display device of claim 2, wherein the bottom segment has a length greater than that of the top segment in the second direction.

17. The display device of claim 1, wherein the display panel comprises a liquid crystal display panel, and wherein the display device further comprises:
a backlight unit configured to emit light to the liquid crystal display panel; and
a mold frame surrounding the backlight unit and supporting the liquid crystal display panel, the mold frame being received into the frame.

18. The display device of claim 1, wherein the bottom, top, and side segments constitute the integral frame.

* * * * *